United States Patent Office 2,767,139
Patented Oct. 16, 1956

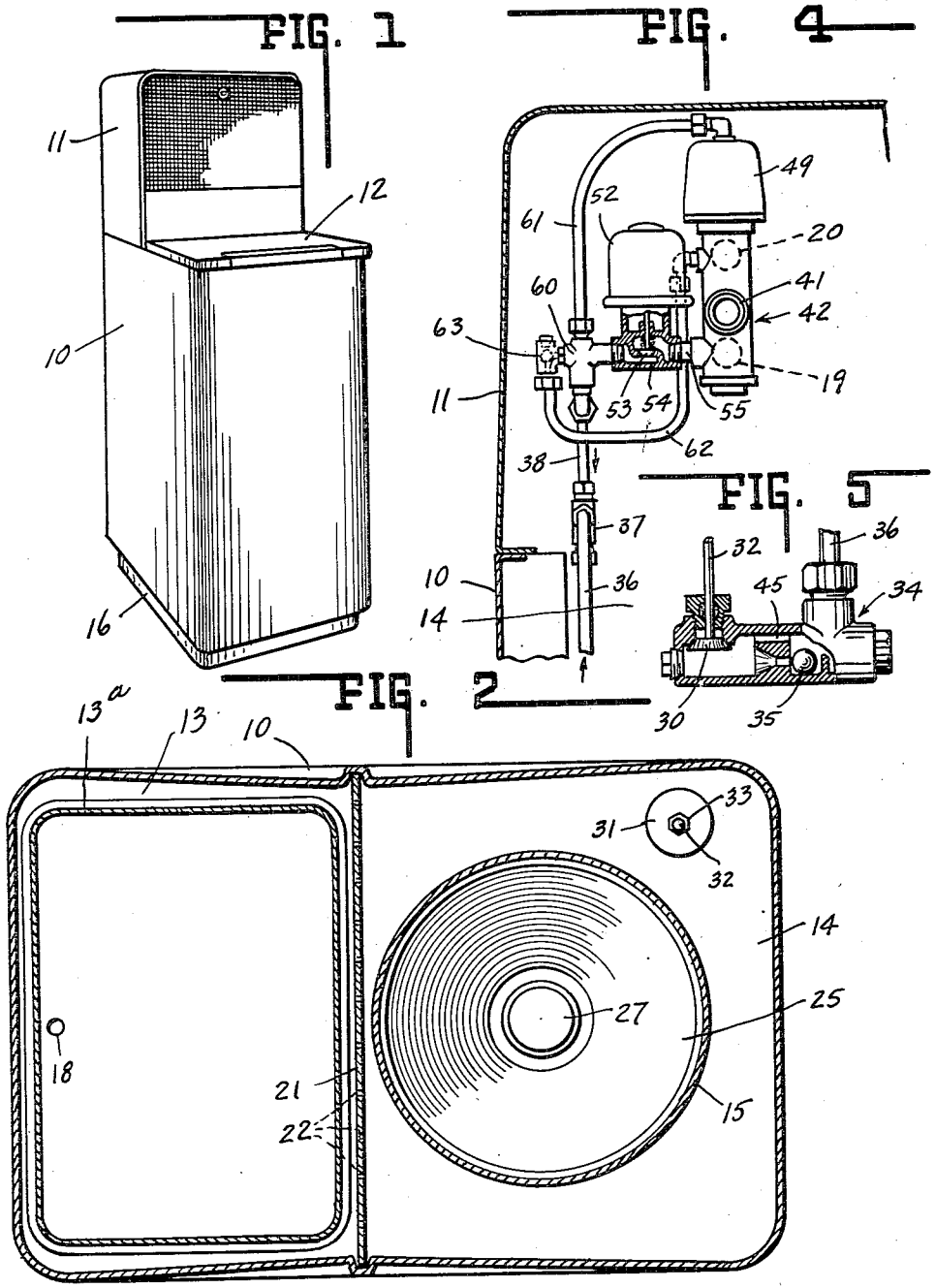

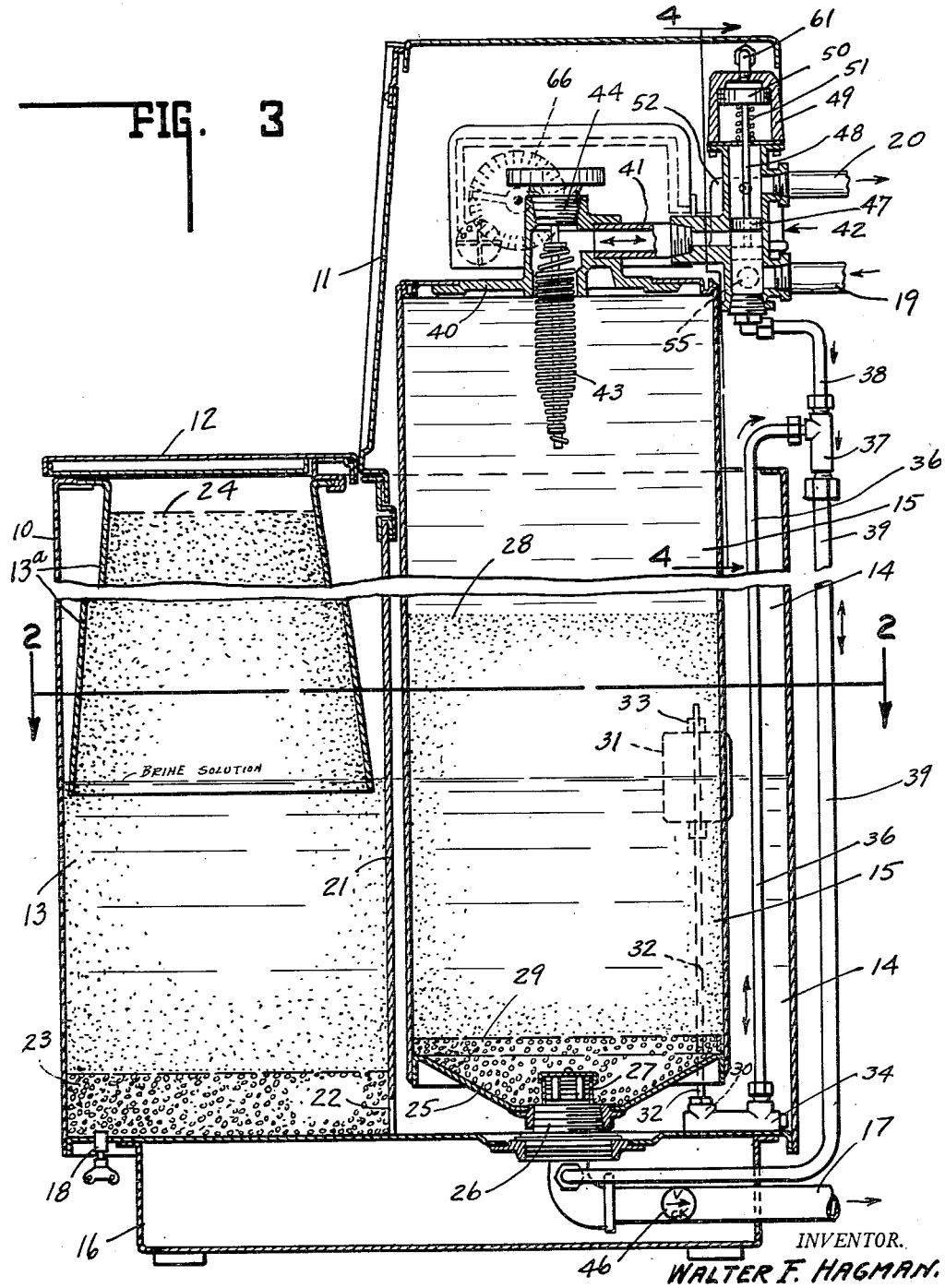

2,767,139

WATER SOFTENER

Walter F. Hagman, Kokomo, Ind., assignor to Globe American Corporation, Kokomo, Ind., a corporation Application March 15, 1955, Serial No. 494,326

8 Claims. (Cl. 210—24)

This invention relates to a water softener, and more particularly to the tank structure and automatic regeneration control, whereby at predetermined intervals and for predetermined periods of time the mineral may be regenerated.

It is the object of the invention to provide a sightly water softener of pleasing appearance which may be conveniently utilized in effecting regeneration of the softening mineral and which embodies a 3-tank system including a mineral containing tank, a brine tank, and a salt storage tank. The tank structure, and particularly the cabinet housing it, is conveniently arranged for dumping charges of salt crystals in the salt tank to provide storage therefor, while permitting contact with the water in the brine tank to maintain a predetermined level of brine for regenerating the mineral in the softener tank.

A feature of the above structure, and one advantage therein, lies in the fact that the brine tank or reservoir surrounds the water softening tank, the lower portion of the water softening tank being submerged in the brine and embraced by the brine tank or reservoir. This arrangement solves the problem of condensation such as to permit the softener to be housed in an attractive cabinet which is maintained dry so that it can be installed in a kitchen or utility room without leakage, or requiring drainage. The condensation which may accumulate on the outer wall of the softener tank is drained down into and caught by the brine tank.

Another feature of the invention resides in the convenience and other advantages in having a salt storage bin separate from, but in communication with, the brine tank or reservoir. By reason thereof, not only is it convenient to dump salt into the bin and maintain its proper supply thereof, but the predetermined quantity of brine to be used in each regenerating cycle may be determined by the level of brine in the brine tank, thereby dispensing with a complicated arrangement of float controlled air and feed water valves.

By reason of this arrangement merely the level of the brine in the brine tank need be controlled by a simple float valve, all of the brine being withdrawn from the tank to admit air to the system during regeneration. There is no salt bed to interfere therewith. All of the brine being withdrawn from the tank, air is then sucked into the fresh water line for aeration of the mineral during the washing and flushing operation, all without elaborate valve and float controlled systems, as is required in the use of the usual salt containing brine tank.

A further feature of the invention resides in the provision of a downwardly and outwardly flared salt storing and confining inner liner for storing the salt above the water line of the salt bin. By means of this inner liner, or a salt bin having similarly flared inner walls, the dry salt above the water line is prevented from bridging over. Thus the salt will keep dropping down and feeding into the water within the salt bin at all times and not be obstructed by a solid bridging thereof as may occur without such an arrangement.

The full nature of the invention will be understood from the accompanying drawings and the following description and claims:

Fig. 1 is a perspective view of the cabinet for the complete system.

Fig. 2 is a plan view of the cabinet with the upper panels broken away, taken on the line 2—2 of Fig. 3.

Fig. 3 is a central vertical section through the cabinet and tanks contained therein.

Fig. 4 is an elevation of the valve control with portions shown in cross section.

Fig. 5 is a cross section of the brine control valve.

In the drawings there is shown a cabinet 10 having a hood portion 11 extending upwardly from the rear thereof and a hinged lid extending forwardly of the hood portion. The cabinet embraces and forms a part of three tanks or receptacles which comprise a salt bin 13 directly under the lid 12, a brine tank 14 adjacent the salt bin and directly under the hood portion 11. It may be noted that the upper end of brine tank 14 is not sealed so that air is freely admitted thereto. Within the brine tank 14 there is a water softening tank 15 which extends up into the hood portion 11.

To prevent bridging over of the salt in the salt bin 13 the bin is preferably lined with a downwardly and outwardly flared salt confining inner liner 13a extending from the top of the bin toward the bottom. It is sufficient for this purpose that the inner walls or the liner of the bin be flared downwardly and outwardly at least to the water line.

The cabinet is supported upon a base 16 which houses an outlet service pipe 17 leading from the bottom of the water softening tank, and provides an elevation for a drain plug 18 in the bottom of the salt bin. For purposes of illustration the particular structure shown herein is adapted for a softener of the downflow type wherein the intake of the water to be softened passes from the water source into the inlet pipe 19 positioned at the top rear of the hood 11. Associated with the inlet pipe 19 there is a drain pipe 20 through which the upflow regeneration and flushing water is discharged. The salt bin is separated from the brine tank 14 by the partition wall 21 having a series of vertical slots adjacent the bottom thereof, as indicated at 22. In the bottom of the salt bin there is a bed of gravel shown at 23 which extends to a level above the slots 22, a supply of salt, indicated at 24 being deposited on the bed of gravel by raising the lid 12.

The softening tank 15 is provided with a dished base 25 screw threaded upon the mounting plug 26 which is in turn threaded into the bottom of the brine tank portion of the housing and which is adapted to receive the intake end of the outlet service pipe 17. A suitable strainer 27 is secured upon the fitting through which water may pass to the service pipe during the downflow softening period. The water passes downwardly through a bed of ion exchange minerals indicated at 28 resting upon a shallow bed of gravel indicated at 29, the mineral and gravel being restrained from entering the service pipe by the strainer 27.

Mounted in the brine tank 14 there is a float control valve 30 which is controlled by the float 31. The float 31 is arranged to slide upon an upstanding stem 32 to engage a stop 33 secured to the upper end of the stem. Thus, when the float reaches its uppermost position, it raises the stem 32 to close the valve 30, but when it drops free of the stop upon the liquid level in the brine tank dropping, it permits opening of the valve by downward movement of the stem by gravity. The valve 30 is positioned in a fitting 34 provided with a ball check valve as indicated at 35. Said fitting is connected to a pipeline 36 leading to a venturi of the usual character, indicated at 37. Said venturi is so arranged that it connects a regenerated feed pipe 38 with a regenerating supply pipe 39, the latter pipe being connected with outlet service pipe 17 adjacent the bottom of the softening tank. At the top of the softening tank there is a closure head 40 which carries a water inlet and discharge pipe 41 communicating at one end with the top of the tank and at the other end with the control valve generally indicated at 42, and as shown in Fig. 4. Extending downwardly into the tank through the closure head there is a spiral wire strainer 43 secured to a closure plug 44 threaded into said head.

By means of the time controlled valves, as hereinafter more particularly described, the general arrangement of the system functions in the following manner. During the softening period the salt bin will contain a supply of salt, and the brine tank will carry a supply of brine solution up to the level indicated which is controlled by the float 31. The brine solution is developed by reason of the water level in the brine tank causing the level of water to rise in the salt bin, passing through the slots 22. Water will become saturated with the salt in the bin and be drawn into the brine tank, particularly during the regenerating period. As water is drawn from the outlet pipe 17 for service, it passes from the source of water supply through pipe 19, valve 42, pipe 41 and strainer 43 downwardly through the bed of mineral 28, which effects the softening thereof, and then through the bed of gravel and strainer 27.

This softening operation continues for a predetermined time interval, for example two or three days. Thereupon the time control valve is actuated to change the direction of water circulation for regeneration. For the regeneration period water from the source is caused to pass into the regenerating feed pipe 38, and downwardly through the venturi 37, through the regenerating supply pipe 39 and upwardly through strainer 27, gravel bed 25, mineral bed 28, strainer 43, discharge pipe 41, back into the valve which directs it through the drain pipe 20 for discharge to a waste.

Due to the downward flow of water through the venturi 37, brine will be drawn through the valve 30 and fitting 34, up the pipe 36 and into the venturi. Thus, the flow of water to the bottom of the brine tank will draw brine into the system and feed it up through the mineral bed for regeneration thereof. After all the brine has been sucked out of the brine tank, as well as the salt bin, air will be drawn from the emptied brine tank 14 through the valve 30 into the regenerating supply pipe 39. The clear water is fed through the pipes 38, 39 causing air to be sucked into the water by the venturi 37, from the pipe line 36 leading from the emptied tank 14 and discharged upwardly through the mineral bed. Thus, there will be a period of aeration along with the period of washing the bed and tank free of brine by the brine free aerated water flowing upwardly therethrough. During this regeneration period brine will be flowed upwardly through the mineral for discharge through the drain pipe 20 followed by a washing and aeration by aerated clear water. After a predetermined time period during which the regeneration and washing occur, the control valves will be reset for the softening operation. Thereupon, water will be directed from the inlet 19 under the normal water pressure through pipe 41 into the softening tank. Inasmuch as the outlet service pipe will be normally closed at the service station, the tank will fill with water. The water in the tank will pass through the bottom of the tank back into the regenerating supply pipe 39, where it joins with the outlet service pipe and will rise therein to overflow into the pipeline 36, passing downwardly therethrough to fitting 34. While the check valve 35 will be closed, there is provided a small bypass 45 which will permit water to seep through the open valve into the brine tank. Therefore, for a period of time there will be a seepage of water back into the brine tank lifting the level therein, as well as in the salt bin, until it actuates float 31 to close the valve and maintain the brine level. Thereupon, the softening action takes place as water is drawn through the service outlet and the cycle has been completed. At this point it may be mentioned that for protection the service outlet is provided with a check valve generally indicated at 46 to prevent backflow of water through the service pipe into the softening tank.

Making reference to the time controlled valve 42, as shown at the top of Fig. 3 and in Fig. 4, there is provided a valve cylinder into which the pipes 19 and 20 connect on opposite sides of the connection between the pipe 41 and the valve cylinder. Operating in the valve cylinder there is a valve piston 47 which moves from the position (Fig. 3) shown in full lines to the position shown in dotted lines. In the full line position water is free to pass from the inlet 19 through the valve body to the pipe 41 and thence downwardly through the strainer and softening tank during the softening action. When the valve piston is moved to dotted line position, the passage between pipes 19 and 41 is cut off and passage between the pipe 41 withdrawn pipe 20 is completed. Thus, in this position, there is no softening downflow, but on the contrary water is permitted to pass upwardly and through the drain pipe 20 during the regeneration period. The valve piston 47 is carried by a piston rod 48 extending upwardly into a hydraulic cylinder 49. The upper end of the rod carries a piston 50, and interposed between the piston 50 and the opposite end of the cylinder there is a compression spring 51. Spring 51 normally biases the valve piston 47 in its upper position as shown by full lines in Fig. 3 during the water softening period.

The valve 47 is controlled hydraulically through the cylinder and piston 49, 50 by a time actuated solenoid valve as shown in Fig. 4, a housing 52 enclosing an ordinary electrically actuated solenoid, which in turn opens and closes the valve 53 in the valve fitting 54. The valve fitting is connected at 55 with valve 42 in the plane of, and offset from the inlet 19. When the valve 53 is in closed position, no action will occur; but when the solenoid is electrically actuated to open the valve 53 water will flow directly from the inlet 19 through the fitting 54 to the 4-way connection 60. The hydraulic line 61 leads from the connection 60 to the top of the hydraulic cylinder 49, the pressure actuating the valve piston 50 to force the valve piston 47 from its full line position to its dotted line position. Upon the valve 53 closing, this pressure will be shut off, and the piston 50 returned to its upper position with the valve piston 47 in its full line position under tension of spring 51. For bleeding the upper end of the valve cylinder 42, as the piston 50 is returned to its upper position, there is a bleeder line 62 connected through a ball check valve 63 with the 4-way connection 60. The fourth line leading from the 4-way connection is the regenerating feed pipe 38 so that when the valve 53 is open not only will hydraulic pressure be imposed upon the piston 50, but water will be forced through the regenerating system, including the regenerating supply pipe 39 and venturi 37.

For setting a timing of the operations there is provided an electric clock mechanism or timer indicated generally at 66, Fig. 3, connected with any suitable source of power, of a type known to those familiar with the art. The timer is connected with the electrical operated solenoid within the solenoid housing 52. It may be set to operate during the night or early morning hours every two or three days, depending upon softening requirements, to open the valve 53 to initiate the regenerating operation. The timer may be set to close the valve 53 at the end of a predetermined regeneration period such as one hour. Thus, the timer may open the valve every seventy-two hours at 2:00 a. m. and close the valve at 3:00 a.m. With such a setting the brine will be fed upwardly through the mineral for about fifteen minutes, or such corresponding time as it takes to empty the brine tank and salt bin. Then, for the next forty-five minutes the mineral will be flushed and aerated. Thereupon, the timer will close the valve, and the softening tank will fill with water ready for the softening service.

From the foregoing it will be observed that there is provided a very compact and sightly unit with a convenient individual salt bin to be kept full of salt. The brine tank will be separated from the salt bin so that there will be no salt solids in the brine tank. The softener will be regenerated, flushed and aerated periodically at a predetermined time over a predetermined period. Thus, other than keeping the salt bin filled with salt, the unit requires no further attention but is self actuating.

The invention claimed is:

1. A water softener comprising a water softening tank, a brine tank surrounding the water softening tank to catch and retain condensation therefrom, a salt bin for receiving a supply of solid salt crystals adjacent and separated from said brine tank by a partition wall, said bin and brine tank being associated as a single cabinet structure, a gravel bed in the bottom of the said bin, a fluid passage between the salt bin and the brine tank below the level of the gravel bed, and a removable lid on said cabinet structure extending over said salt bin to permit charges of salt to be dumped therein.

2. A water softener comprising a unitary cabinet structure including a water softening tank, a brine tank surrounding the softening tank, and a salt bin for receiving a supply of solid salt crystals adjacent and separated from said brine tank, a portion of the cabinet structure embracing the softening tank with a portion thereof extending over the salt bin, a removable lid on said cabinet structure extending over said salt bin to permit charges of salt to be dumped therein, and a removable panel forming a rearwardly offset front of said cabinet extending upwardly from said salt bin portion to permit access to the top of said softening tank.

3. A water softener comprising a water softening tank, a brine tank surrounding the water softening tank to catch and retain condensation therefrom, a salt bin for receiving a supply of solid salt crystals adjacent and separated from said brine tank by a partition wall, said bin and tanks being associated as a single cabinet structure, a gravel bed in the bottom of the said bin, a fluid passage between the salt bin and the brine tank below the level of the gravel bed, and a downwardly and outwardly flared salt storing and confining inner liner in said bin extending from the top thereof toward the bottom for preventing dried salt bridging.

4. A water softener comprising a cabinet housing, a partition vertically disposed in said housing to provide a salt crystal receiving bin on one side thereof and a brine containing tank on the other side thereof, said partition having openings at the bottom thereof to permit liquid to flow between said tank and bin, a water softening tank mounted within and embraced by said brine tank and an upwardly extending portion of said cabinet housing, and a downwardly and outwardly flared salt storing and confining inner liner in said bin extending from the top thereof toward the bottom for preventing dried salt bridging.

5. A water softener comprising a water softening tank, a brine tank surrounding the water softening tank to catch and retain condensation therefrom, a salt bin having a downwardly and outwardly flared wall for receiving a supply of solid salt crystals adjacent and separated from said brine tank, said bin and brine tank being associated as single cabinet structure, a gravel bed in the bottom of the said bin, a fluid passage between the salt bin and the brine tank below the level of the gravel bed, and a removable lid on said cabinet structure extending over said salt bin to permit charges of salt to be dumped therein.

6. A water softening system including a water softening tank having a charge of mineral therein, a salt receiving bin, a salt crystal free brine reservoir embracing said tank and connecting with said bin, a source of fresh water under pressure connected into a regenerating line leading to one end of said tank for regeneration of the mineral, a venturi in said line, a float controlled valve mounted in a fitting adjacent the bottom of said brine reservoir connected with said venturi through which brine is drawn into said line until the brine falls below the level of said valve, said venturi thereafter drawing air through said valve into said line for aerating and flushing the mineral in said tank, and a float operably connected to said valve for closing it upon the brine in said reservoir rising to a predetermined level, said valve being opened against the buoyancy of said float upon suction being applied thereto by said venturi.

7. A water softening system including a water softening tank having a charge of mineral therein, a salt receiving bin, a salt crystal free brine reservoir surrounding said tank and connecting with said bin, a source of fresh water under pressure connected into a regenerating line leading to one end of said tank for regeneration of the mineral, a venturi in said line, a float controlled valve mounted in a fitting adjacent the bottom of said brine reservoir connected with said venturi through which brine is drawn into said line until the brine falls below the level of said valve, said venturi thereafter drawing air through said valve into said line for aerating and flushing the mineral in said tank, the line leading from said water source to the other end of said tank for softening thereof, a valve means operable to alternately direct water directly into the tank for softening and into said regenerating line for regeneration, means for operating said valve to shut off the water to the regenerating line and introduce water directly into the tank following the regeneration operation, whereby water from said tank will flow through said regenerating line venturi and float controlled valve in a reverse direction to said brine reservoir, and a float operably connected with said valve for closing it upon the brine in said reservoir rising to a predetermined level, said valve being arranged to open against the buoyancy of said float upon suction being applied thereto by said venturi.

8. A water softening system as set forth in claim 3, wherein said valve fitting is provided with an obstruction having an enlarged port therein controlled by a check valve for permitting rapid passage of brine into said regenerating line, and a restricted port for permitting fresh water to flow in the opposite direction from the tank through said regenerating line and valve into said brine reservoir.

References Cited in the file of this patent

UNITED STATES PATENTS

| | | |
|---|---|---|
| 1,725,110 | Stickney | Aug. 20, 1929 |
| 2,265,225 | Clark | Dec. 9, 1941 |
| 2,370,190 | Ralston | Feb. 27, 1945 |
| 2,500,134 | Murray | Mar. 7, 1950 |
| 2,620,805 | Page et al. | Dec. 9, 1952 |
| 2,715,098 | Whitlock | Aug. 9, 1955 |